(12) United States Patent
Wier

(10) Patent No.: US 6,241,173 B1
(45) Date of Patent: Jun. 5, 2001

(54) BELT RETRACTOR FOR A SAFETY BELT RESTRAINT SYSTEM

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/298,694

(22) Filed: Apr. 23, 1999

(30) Foreign Application Priority Data

Apr. 23, 1998 (DE) .......................................... 298 07 433 U

(51) Int. Cl.$^7$ .................................................. B60R 22/34
(52) U.S. Cl. ............................................................ 242/382
(58) Field of Search ................................ 242/382, 382.1, 242/382.2, 382.3, 382.4, 382.5, 383.4, 384, 384.1, 384.2, 384.3, 384.4, 384.5, 384.6; 280/806; 297/478; 74/577 R

(56) References Cited

U.S. PATENT DOCUMENTS

| 518,051 | * | 4/1894 | Butz .................................. 74/577 R |
| 3,294,446 | * | 12/1966 | Fontaine ............................... 242/382 |
| 3,632,058 | | 1/1972 | Stoffel . |
| 5,388,780 | * | 2/1995 | Matsuki ................................ 242/384 |
| 5,529,259 | | 6/1996 | Woydick et al. ..................... 242/376 |
| 5,593,105 | | 1/1997 | Schmid et al. ..................... 242/383.4 |
| 5,934,596 | * | 8/1999 | Gorman et al. ...................... 242/384 |

FOREIGN PATENT DOCUMENTS

| 1163684 | 2/1964 | (DE) . |
| 1531546 | 1/1970 | (DE) . |
| 1946903 | 3/1970 | (DE) . |
| 2121642 | 11/1972 | (DE) . |
| 3828389 | 3/1990 | (DE) . |
| 4232237 | 3/1994 | (DE) . |
| 9413087 | 11/1994 | (DE) . |
| 0631911 | 1/1995 | (EP) . |
| 0638467 | 2/1995 | (EP) . |

* cited by examiner

Primary Examiner—John M. Jillions
(74) Attorney, Agent, or Firm—Tarolli, Sundheim, Covell, Tummino & Szabo L.L.P.

(57) ABSTRACT

A belt retractor for a safety belt restraint system comprises a frame in which a belt spool is rotatably mounted, which spool is provided at at least one of its axial ends with a locking toothing, and at least one locking catch which can be guided into the locking toothing of the belt spool and has a bearing pin at one end. The locking catch is provided with a bore. The bearing pin is formed by a wire pin which is arranged in the bore and onto which the locking catch is pressed.

12 Claims, 4 Drawing Sheets

BELT RETRACTOR FOR A SAFETY BELT RESTRAINT SYSTEM

TECHNICAL FIELD

The invention relates to a belt retractor for a safety belt restraint system.

BACKGROUND OF THE INVENTION

The locking catch serves to lock the belt spool in the frame in the case of need, so that the safety belt held on the belt spool can not be withdrawn further from the belt retractor. The locking catch is mounted on the frame usually by means of bearing pins which are constructed in one piece with the locking catch. The high loads which are introduced into the frame by the locking toothing via the locking catch with the belt spool locked, are not transferred through the bearing pin, however; these forces are introduced into the frame by the end of the locking catch facing away from the locking toothing resting against the frame.

BRIEF SUMMARY OF THE INVENTION

The object of the invention consists in providing a belt retractor in which the mounting of the locking catch is achieved at a more favorable cost.

This is achieved by a belt retractor comprising a frame in which a belt spool is rotatably mounted, which spool is provided at at least one of its axial ends with a locking toothing, and comprising at least one locking catch which can be guided into the locking toothing of the belt spool and has a bearing pin at one end. The locking catch is provided with a bore. The bearing pin is formed by a wire pin which is arranged in the bore and onto which the locking catch is pressed. With this construction, a range of advantages can be achieved. The locking catch itself is now a substantially two-dimensional part. This makes it possible to construct the locking catch for example as a profiled part, i.e. starting from a bar, the outer circumference of which corresponds to the outer contour of the locking catch and which is cut into a plurality of discs which each form a locking catch. Alternatively, it is also possible to construct the locking catch as a diecast metal part. In each case, the wire pin is inserted as a separate part into the locking catch. The locking catch is pressed onto the wire pin. This makes it possible to connect the locking catch with the wire pin by means of a particularly simple processing step. Preferably, provision can be made that the wire pin is provided with axial grooves in the region of the bore of the locking catch. This increases the holding force of the wire pin in the bore of the locking catch.

If, according to a possible embodiment, only a single locking catch is used in order to lock the belt spool, the wire pin projects over the two outer faces of the locking catch. This makes it possible to mount the locking catch precisely on the frame.

If, according to a possible different embodiment, two locking catches are used which can be guided into two locking toothings which are separated from each other and which each are arranged at an axial end of the belt spool, the wire pin can extend continuously from the one locking catch to the other, the pin projecting over the outer faces, facing away from each other, of the locking catches. The locking catches can then be mounted precisely by means of the two ends of the wire pin, the wire pin being able to additionally serve for transferring the guiding movement of a locking catch into the locking toothing to the other locking catch. In fact, usually only one locking mechanism arranged on a side of the belt retractor is used, which introduces the guiding movement of the locking catches on a side of the frame.

Alternatively, it is also possible that the bore is constructed so as to be profiled and the wire pin is provided with a complementary profile in the region of the bore. In this way, a connection is achieved with an interlocking fit between the wire pin and the locking catch, which is particularly advantageous when two locking catches are used on one wire pin, which both have to be guided into the locking toothings of the belt spool by means of a locking mechanism acting only on one side.

According to a preferred embodiment of the invention, provision is made that the end of the locking catch facing away from the locking toothing is provided with a recess into which a cross-piece of the frame engages. This construction ensures that the locking catch is supported securely and reliably in the frame even when it introduces high loads from the belt spool into the frame, without being able to slip.

According to a possible further development, provision can be made that on the exterior of the frame a guide plate is arranged which, together with a collar guides the locking catch, which collar separates from the locking toothing a region of the belt spool provided to receive the safety belt. The guide plate assists the precise guidance of the locking catch, so that the latter can be guided precisely into the locking toothing under all circumstances.

Preferably, provision is made that the belt retractor has two locking catches which are made of different materials. One locking catch should be made of a light metal such as aluminum or magnesium, and the other should be made of steel or a zinc diecast part, that is, an extremely sturdy material. Usually, the catches have previously always been constructed of steel, something which however increases the weight and the inertia during the guiding-in process. Making one catch from a more lightweight material may distinctly reduce the inertial mass of the unit consisting of the locking catches and the bearing pins.

DETAILED DESCRIPTION OF PREFERRED EMBODIMENTS

Figure 1:
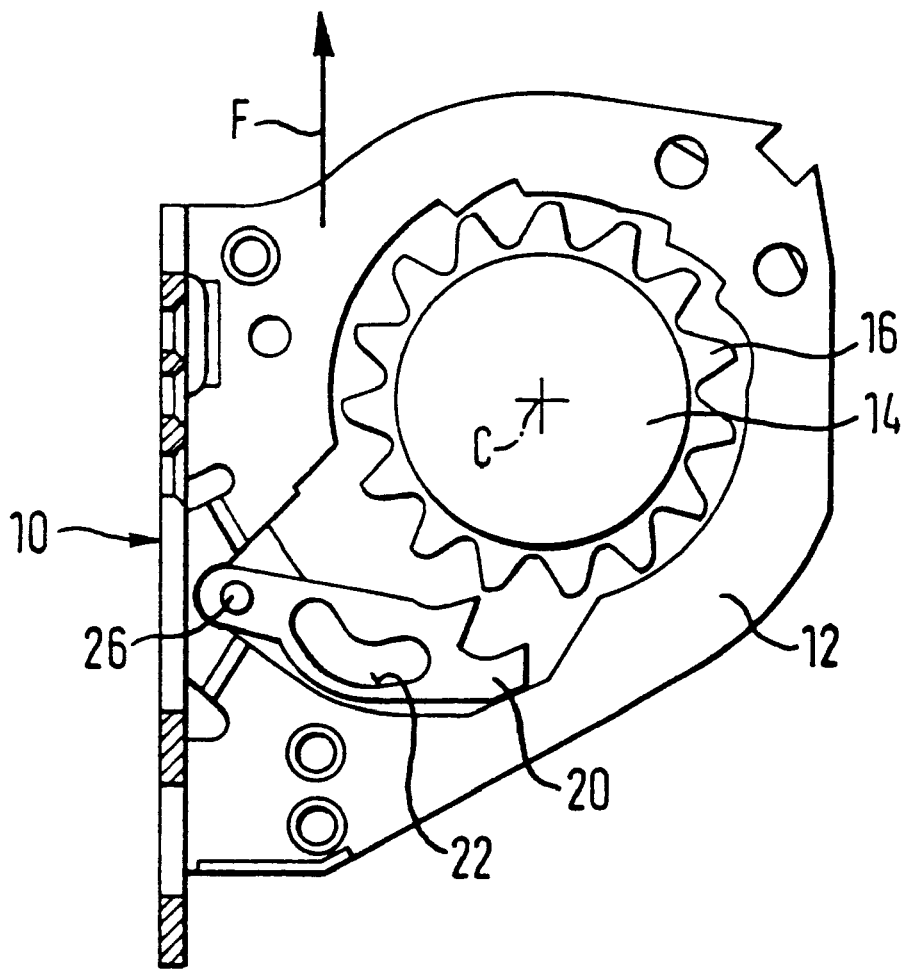
FIG. 1 shows a diagrammatic side view of a belt retractor according to the invention.

In FIG. 1, a belt retractor 10 according to the invention is shown diagrammatically. This contains a frame 12 in which a belt spool 14 is rotatably mounted. The belt spool 14 is provided at its axial end, visible in FIG. 1, with a locking toothing 16. The belt spool 14 can receive a safety belt, merely indicated by its unwinding direction F.

Figure 2:
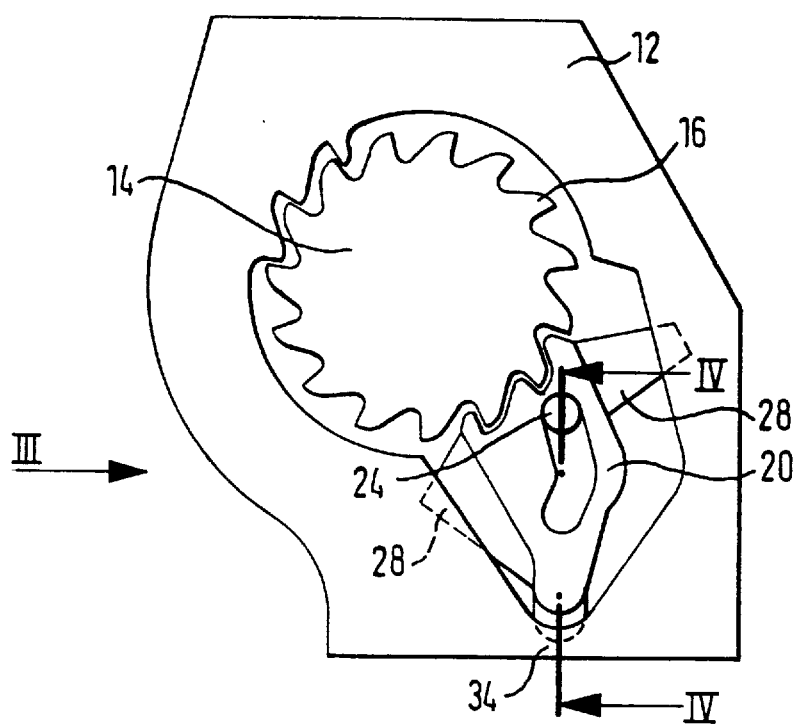
FIG. 2 shows a diagrammatic side view of a belt retractor according to the invention and in accordance with a further development.

On the frame 12, a locking catch 20 is arranged, which is provided with a control recess 22. A control extension 24 (see FIGS. 2 and 4) can engage into the control recess 22, which extension 24 is part of a locking mechanism not illustrated in the Figures. This locking mechanism, which is constructed in a conventional manner, serves to guide the locking catch 20 into the locking toothing 16 either in a webbing-sensitive or vehicle-sensitive manner and thereby to lock the belt spool 14, so that the safety belt can not be withdrawn further from the belt spool 14. The locking catch 20 is a zinc diecast part, an aluminum diecast part or made of profiled aluminum. It may furthermore also be of magnesium or steel.

Figure 3:
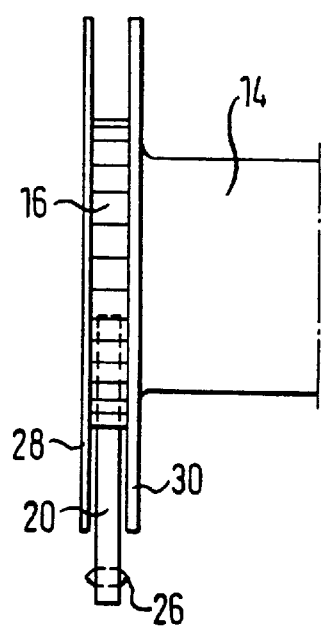
FIG. 3 shows a top view onto the side of the belt retractor visible in FIG. 2, along the arrow III of FIG. 2.

The locking catch 20 is provided with a bearing pin 26 which is held in corresponding recesses which can be provided in plastic plates which are fastened to the frame 12. As can be seen in particular in FIG. 3, the bearing pin 26 projects over the two outer faces of the locking catch 20. The bearing pin is formed by a galvanized wire pin which is inserted into a bore in the locking catch 20 in such a way that it projects with its two axial ends over the outer face of the locking catch. The wire pin 26 is either held in the bore in the locking catch 20 by a press fit being provided between the bore and the wire pin, so that the wire pin has to be pressed into the locking catch, or by the end of the locking catch provided with the bore being pressed onto the wire pin, after the latter has been inserted into the bore.

For better guidance, a guide plate 28 is provided on the frame, which plate 28 together with a collar 30, which separates a region of the belt spool provided to receive the safety belt from its locking teeth 16, guides the locking catch 20 in an axial direction with respect to the bearing pin 26.

Figure 4:
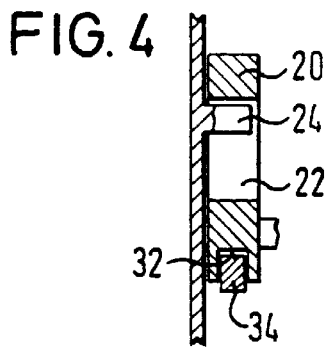
FIG. 4 shows a sectional view along the plane IV—IV of FIG. 2.

As can be seen in FIG. 4, the end of the locking catch facing away from the locking toothing 16 is provided with a recess 32 into which a cross-piece 34 of the frame 12 engages. This ensures that the locking catch is also supported securely in the frame in the case of high stresses.

Figure 5:
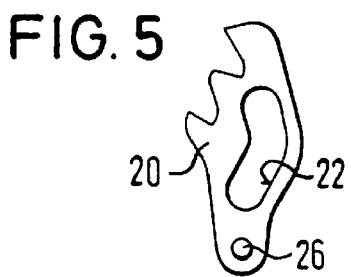
FIG. 5 shows a side view of a locking catch for a belt retractor according to the invention, in accordance with a second further development.
Figure 6:
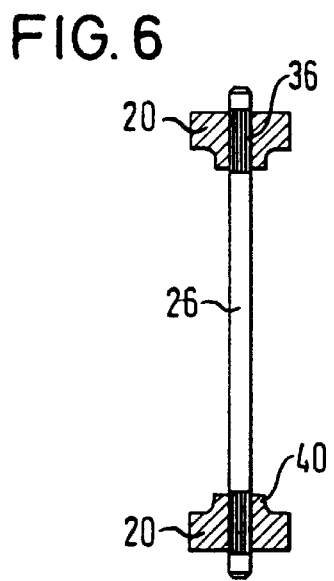
FIG. 6 shows a diagrammatic top view onto a pair of locking catches for a belt retractor according to the second further development.

In FIGS. 5 and 6 a pair of locking catches is shown, which is used in a belt retractor according to the invention in accordance with a second further development. In this case, the belt retractor is provided with a locking toothing 16 at each axial end of the belt spool 14. One locking catch 20 each is guided into this locking toothing. In order to guide both locking catches 20 simultaneously into the locking toothings, these are connected with each other non-rotatably by means of the wire pin 26. The wire pin 26 projects over the outer faces, facing away from each other, of the locking catches 20, so that here also corresponding bearing pins are formed. The wire pin 26 is provided with axial grooves 36 in the region of the bores of the locking catches 20, so that the non-rotatability of the locking catches 20 on the wire pin 26 is ensured. Alternatively, it would also be possible to construct the bore in the locking catches and in the wire pin so as to be profiled, so that a connection with an interlocking fit is formed. The wire pin 26 has a comparatively small diameter in the order of approximately 3 mm, so that it does not impair the space available to receive the safety belt on the belt spool 14.

Of the two locking catches 20, one is fabricated of a material having a lower specific gravity, preferably of aluminum or magnesium. In contrast, the other locking catch is made of a zinc diecast material. When the more lightweight locking catch of aluminum or magnesium is guided into the locking toothing, this locking catch may well be slightly deformed in the region of the guided-in teeth. But the locking mechanism as a whole is operative all the same because the other, more sturdy, catch is able to take up a greater load.

Figure 7:
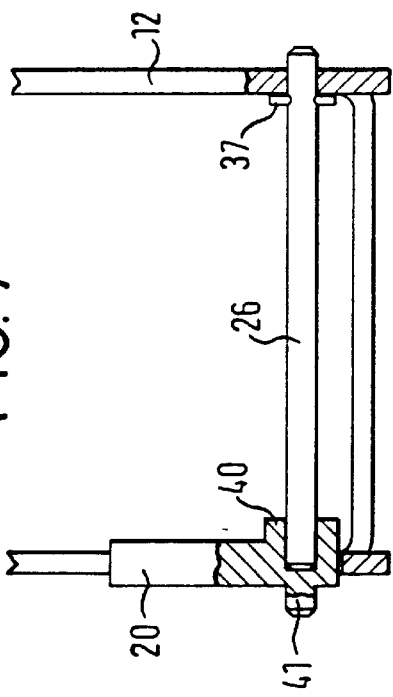
FIG. 7 shows a diagrammatic side view, partially in section, of a belt retractor according to the invention, in accordance with a third further development.
Figure 9:
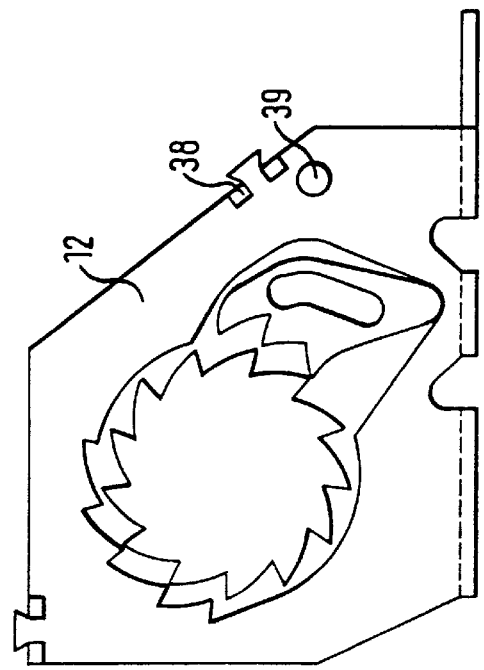
FIG. 9 shows a diagrammatic side view of the belt retractor of FIG. 7.
Figure 8:
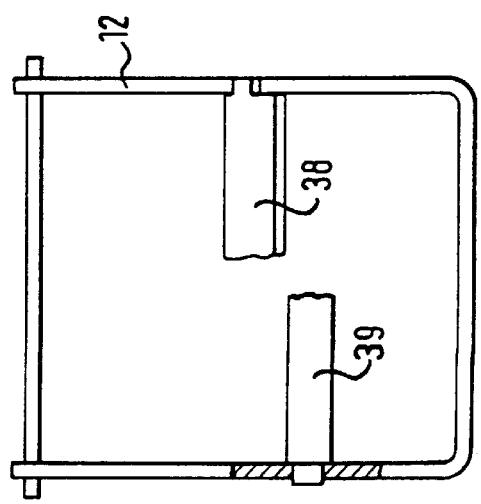
FIG. 8 shows a diagrammatic top view, with omissions, onto the belt retractor of FIG. 7.

In FIGS. 7 to 9 a belt retractor according to a third further development can be seen. The locking catch 20 is provided on its exterior with a formed-on pin 41 which is arranged concentrically to the bore in which the wire pin 26 is held. A single locking catch is used, and the wire pin rests in an opening on the side of the housing lying opposite the locking catch 20. In order to prevent a displacement of the locking catch to the right with respect to FIG. 7, a locking bolt 37 is provided in the wire pin 26. At the transition from the locking catch 20 to the wire pin 26, a collar 40 is provided on the locking catch 20.

For stiffening, the frame of the belt retractor is provided with a cross-piece 38 which is arranged in the vicinity of the regions of the frame against which the locking catch lies under load. In addition, a pin 39 can be arranged in openings of the frame, which increases the buckling strength of the frame in the corresponding region.

What is claimed is:

1. A belt retractor for a safety belt system restraint system, said retractor comprising:

a frame having a rotatably mounted belt spool, said spool having axial ends, at least one of said axial ends having a locking toothing, and at least one locking catch having a bearing pin at one end and being guided into said locking toothing of said belt spool, said locking catch being provided with a bore, and said bearing pin being a wire pin arranged in said bore, said locking catch being pressed onto said bearing pin, and an end of said locking catch, facing away from said locking toothing, being provided with a recess into which a cross-piece of said frame engages.

2. The belt retractor according to claim 1, wherein a single locking catch is used, wherein said bore is a through bore and wherein said locking catch has two outer faces, said wire pin projecting over said outer faces.

3. The belt retractor according to claim 1, wherein two locking catches are used and wherein said wire pin extends continuously from one locking catch to the other, said pin projecting over outer faces, facing away from each other, of said locking catches.

4. The belt retractor according to claim 3, wherein said wire pin is provided with axially extending grooves in the region of said bore of said locking catch.

5. The belt retractor according to claim 3, wherein said bore is constructed so as to be profiled and said wire pin is provided with a complementary profile in the region of said bore.

6. The belt retractor according to claim 1, wherein a single locking catch is used and wherein said wire pin engages into an opening in a part of said frame lying opposite this locking catch.

7. The belt retractor according to claim 1, wherein said locking catch is provided with a collar at a transition from said locking catch to said wire pin.

8. The belt retractor according to claim 1, wherein said locking catch is a profiled part.

9. The belt retractor according to claim 1, wherein said locking catch is a diecast part.

10. A belt retractor for a safety belt restraint system, said retractor comprising:
- a frame having a rotatably mounted belt spool, said spool having axial ends, at least one of said axial ends having a locking toothing, and
- at least one locking catch having a bearing pin at one end and being guided into said locking toothing of said belt spool,
- said locking catch being provided with a bore, and
- said bearing pin being formed by a wire pin arranged in said bore and onto which said locking catch is pressed, and
- a guide plate arranged on the exterior of the frame which, together with a collar, guides said locking catch,
- said collar separating from said locking toothing region of said belt spool provided to receive said safety belt.

11. A belt retractor for a safety belt restraint system, said retractor comprising:
- a frame having a rotatably mounted belt spool, said spool having axial ends, at least one of said axial ends having a locking toothing, and
- at least one locking catch having a bearing pin at one end and being guided into said locking toothing of said belt spool,
- said locking catch being provided with a bore, and
- said bearing pin being formed by a wire pin arranged in said bore and onto which said locking catch is pressed, and
- two locking catches made from different materials and mounted on a common bearing pin.

12. The belt retractor according to claim 11, wherein one locking catch consists of a light metal.

* * * * *